United States Patent [19]

Taplin

[11] 4,191,146

[45] Mar. 4, 1980

[54] MEANS FOR OPTIMIZING FUEL ECONOMY IN AN INTERNAL COMBUSTION ENGINE

[75] Inventor: Lael B. Taplin, Bloomfield, Mich.

[73] Assignee: The Bendix Corporation, Southfield, Mich.

[21] Appl. No.: 882,002

[22] Filed: Feb. 28, 1978

[51] Int. Cl.$^2$ .............................................. F02P 5/04
[52] U.S. Cl. ........................ 123/117 R; 123/32 EA; 123/32 EE
[58] Field of Search ....... 123/117 R, 117 D, 146.5 A, 123/148 E, 32 EA, 32 EE, 32 ED

[56] References Cited

U.S. PATENT DOCUMENTS

| | | | |
|---|---|---|---|
| 2,687,612 | 8/1954 | Anderson et al. | 123/32 EA |
| 3,897,766 | 8/1975 | Pratt, Jr. et al. | 123/117 R |
| 4,009,699 | 3/1977 | Hetzler et al. | 123/117 D |
| 4,026,251 | 5/1977 | Schweitzer et al. | 123/148 E |
| 4,064,846 | 12/1977 | Latsch et al. | 123/117 D |
| 4,073,269 | 2/1978 | Herth et al. | 123/32 EE |
| 4,098,244 | 7/1978 | Sumiyoshi et al. | 123/117 R |

FOREIGN PATENT DOCUMENTS 2412487  9/1975  Fed. Rep. of Germany ...... 123/117 R

OTHER PUBLICATIONS

Apparatus for varying engine spark timing to maximize induction manifold vacuum; Research Disclosure No. 146, pp. 42–43; June 1976.

Primary Examiner—Charles J. Myhre
Assistant Examiner—Andrew M. Dolinar
Attorney, Agent, or Firm—William A. Marvin; Russel C. Wells

[57] ABSTRACT

A self-adaptive system for optimizing ignition timing in an internal combustion engine wherein a signal representing engine manifold absolute pressure is multiplied by a signal representing engine speed to provide a product signal. The product signal is differentiated and applied as the numerator in a divider. The quotient output of the divider is fed back to the divider input as the denominator. The quotient output of the divider is further integrated and the integrated quotient is used as a command signal for setting the spark timing.

6 Claims, 2 Drawing Figures

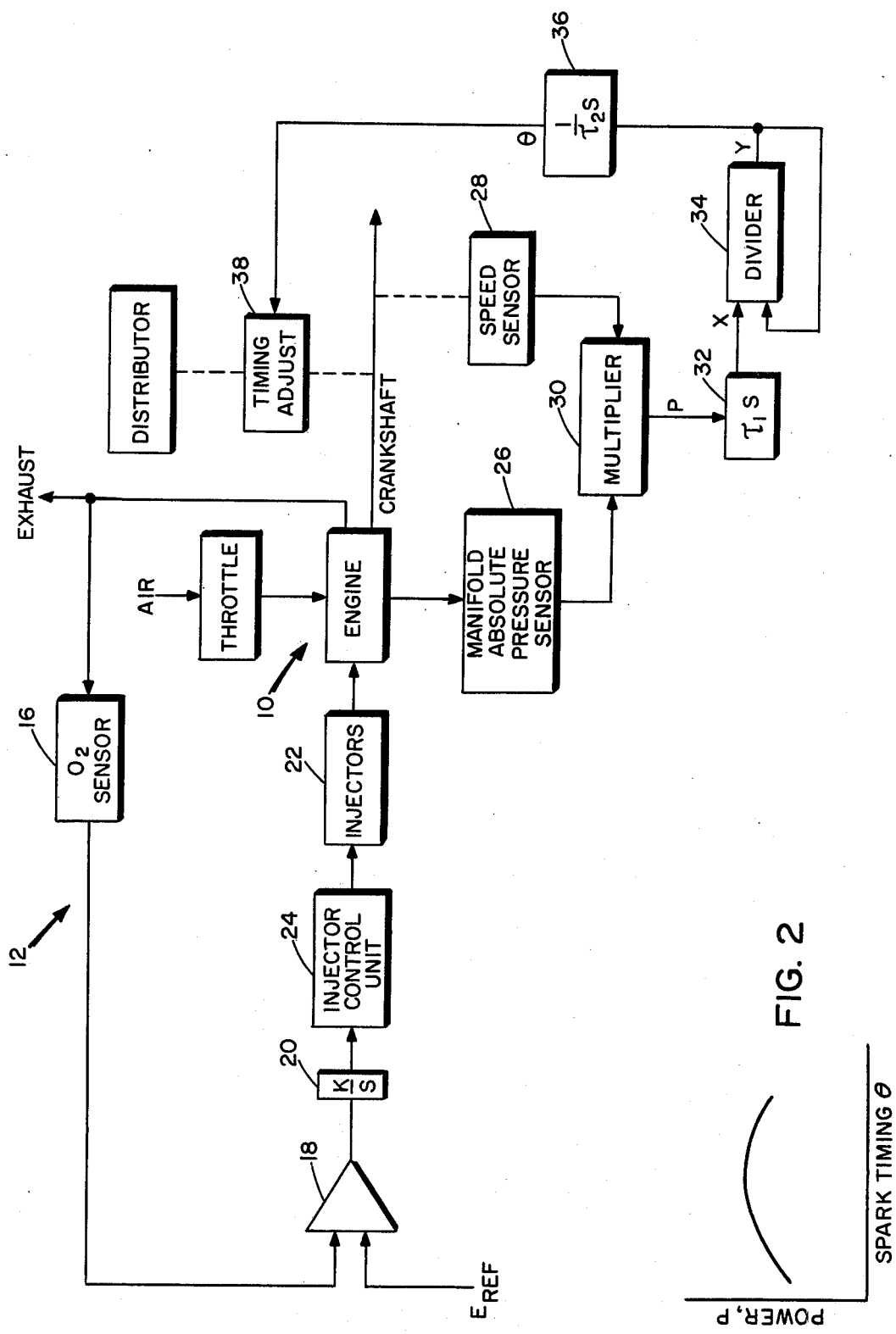

MEANS FOR OPTIMIZING FUEL ECONOMY IN AN INTERNAL COMBUSTION ENGINE

The present invention relates to means for optimizing fuel economy in a spark ignited internal combustion engine having closed loop electronic fuel injection. More particularly, it relates to a spark timing adjuster controlled by an extremum type controller in order to maximize engine power output.

Electronic fuel injection systems for internal combustion engines have been the subject of concentrated development in recent years. These systems offer the promise of improved fuel economy and efficient control of pollutants contained in the engine exhaust through their ability to provide precise control of the engine air/fuel mixture over a wide range of load conditions. Such systems sense a number of operating conditions and proportion the fuel according to a predetermined schedule which represents the best compromise between power output, fuel economy and permissible emission levels for the ambient operating conditions.

It has been recognized, in U.S. Pat. No. 3,964,443, for example, that a similarly sophisticated electronic system may be used to control the engine spark timing according to a predetermined schedule. However, whether the control is applied to fuel mixture or spark timing or both, the controlled variable follows a schedule which is determined empirically on a test bed engine which is exemplary of the engine in actual use. Obviously production variations, state of maintenance and wear may cause the optimum schedule of the controlled variable of the engine in use to be different from the predetermined schedule. What is required is a self-adaptive control system which will automatically adjust the controlled variable to produce maximum performance under the ambient operating conditions.

The use of optimizing techniques in connection with spark timing controls for internal combustion engines has been heretofore disclosed in U.S. Pat. Nos. 3,142,967 and 3,596,643. These patents describe an optimizing method which involves oscillating a selected machine variable within narrow preset limits. The effect of this oscillation on the machine performance, as observed by sensing the speed, torque or acceleration of the machine, is compared with the change made in the machine variable. If the effect was an increase in the sensed performance at the time the variable was increased, the basic setting of the variable is adjusted upwards. Conversely, if the increase in performance occurred at the time the variable was decreased, the basic setting of the variable is adjusted downwards. The closed loop form of the control causes the adjusted variable to be forced into a position producing maximum machine performance.

An essential feature of the techniques applied in above cited patents is the oscillation or "dithering" of the selected variable. In the book "Introduction to Optimization Practice" by Pun, published by John Wiley & Sons, 1969, there is disclosed at page 125 a "divider method" of extremum tracking technique which has the advantages of not perturbing the machine variable under control. This publication speaks in general terms without any disclosure of the manner in which the "divider method" may be utilized for optimizing the performance of an internal combustion engine.

It is an object of this invention to provide means for improving the performance, and hence, fuel economy of an internal combustion engine.

It is a further object of the invention to provide an engine spark timing control which responds to the engine power output in a self-adaptive manner to optimize the engine spark timing for maximum performance.

It is another object of the invention to provide means for optimizing the performance of a spark ignited internal combustion engine utilizing self-adaptive means for adjusting the spark timing which operates without continuous oscillation of the spark timing.

Briefly, the invention comprises means for optimizing the spark timing of an engine wherein an engine performance signal comprising the product of a signal indicative of engine manifold absolute pressure and a signal indicative of engine speed is differentiated and applied as the numerator in a divider circuit, the output of which is fed back as the denominator. The output of the divider is integrated and applied to means for adjusting the engine spark timing. As a result, the spark timing is driven to a position producing maximum engine power.

In the drawings:

FIG. 1 is a functional block diagram of the invention; and

FIG. 2 is a generalized characteristic curve showing the engine power output v. spark timing.

FIG. 1 shows an automobile engine 10 equipped with a closed loop electronic fuel injection system 12. As is usual, the speed of the engine is commanded by the position of a throttle which controls the flow of combustion air to the engine. The fuel injection system 12 includes various sensors, now shown, for determining the ambient operating conditions, such as atmospheric pressure and temperature, engine temperature, speed, load demand and the like.

An oxygen sensor 16 is exposed to the exhaust gas stream to detect the presence or absence of oxygen therein. Sensor 16 is not a linear device providing an output proportional to the oxygen content of the exhaust gases. Instead its characteristic is substantially that of a switch which delivers a constant voltage when there is no oxygen in the exhaust gas, indicating an air/fuel mixture richer than stoichiometric and which delivers zero voltage when some oxygen is present in the exhaust gas, indicating a mixture leaner than stoichiometric.

The output of sensor 16 is compared with $E$REF in a comparator switch 18 which produces a positive or negative output of constant magnitude depending on which of the inputs is greater. The output of comparator 18 is integrated in an integrator 20, the output of which controls the pulse width of the switching pulses to the fuel injectors 22 produced by the injector control unit 24.

In a closed loop electronic fuel injection system of the type described the air/fuel mixture exhibits a limit cycle oscillation having an average value displaced on the rich or lean side of stoichiometric an amount dependent upon the value of $E$REF.

FIG. 2 shows a generalized performance curve for an internal combustion engine wherein power output is plotted against spark timing as the engine variable, the air/fuel mixture being held constant. Whatever the engine load may be, the engine performance curve will be of the same general shape as FIG. 2. It is apparent from this curve that an optimum value for spark timing exists, namely at the peak of the curve, whereat engine performance and hence fuel economy will be a maximum. The next portions of FIG. 1 to be described relate a self-adaptive means for adjusting the spark timing to the value yielding peak engine performance.

Again referring to FIG. 1, there is shown a manifold absolute pressure sensor 26 and an engine speed sensor 28. The engine manifold absolute pressure reasonably approximates the torque output of the engine. The product of the signals from pressure sensor 26 and speed sensor 28 therefore provides a signal reasonably approximating the engine power output. This power output signal, from a multiplier 30, is differentiated in a differentiator 32 and then applied as the numerator x to a divider 34. The output y of the divider 34 is fed back to the input thereof as the denominator. The output of divider 34 is integrated in an integrator 36, the output of which constitutes the control signal for the spark timing adjusting means 38.

The ignition system may be of the electronic type or it may be of the traditional cam actuated breaker type. In an electronic type, for example as disclosed in U.S. Pat. 3,885,534, engine crankshaft positon is represented by a voltage ramp function. The ramp function is compared with a reference voltage and spark is triggered at the time the ramp function rises to the value of the reference voltage. In such a system, spark timing would be adjusted by utilizing the output of integrator 36 as the reference voltage.

In an ignition system of the cam operated breaker type spark timing is adjusted by changing the position of the breaker points relative to the cam lobes through a mechanical link. For an ignition system of the latter type the spark timing adjusting means 38 would be constituted by an electromechanical servo and the output of integrator 36 would be applied thereto as the command signal.

The operation of the divider method of extremum control can be explained as follows:

The output Y of divider 34 is $$Y = X/Y. \quad (1)$$

The output of multiplier 30 is $$MAP \times N = P. \quad (2)$$

Where MAP is the manifold absolute pressure signal;
N is the speed signal; and
P is a signal proportional to engine power.
The output of differentiator 32 is $$X = \tau_1 dP/dt. \quad (3)$$

The output of integrator 36 is $\theta$, the spark timing angle, and the input Y to integrator 36 is the time derivative of the output, or $$Y = \tau_2 d\theta/dt. \quad (4)$$

Substituting equations (3) and (4) in equation (1) and rearranging, $$d\theta/dt = \tau_1/(\tau_2)2] dP/d\theta. \quad (5)$$

Equation (5) shows that the operation of the divider method of extremum control is such that the rate of change of spark angle is proportional to the slope of the performance curve (FIG. 2) and the circuit, operating in inverse feedback fashion, adjusts $\theta$ in the direction to reduce the slope $dP/d\theta$ to zero, thus maximizing the power output.

The invention claimed is:

1. In an internal combustion engine of the spark ignition type, a system for optimizing spark timing comprising:

means for generating a speed signal proportional to the speed of the engine;
 means for generating a pressure signal proportional to the engine manifold absolute pressure;
 means for multiplying together said speed and said pressure signals for generating a product signal; and
 adaptive controller means responsive to said product signal from said multiplying means for setting the ignition spark timing of the engine to maximize the amplitude of said product electrical signal.

2. A system for optimizing spark timing as claimed in claim 1 wherein said controller means includes:

means for differentiating said product signal; divider means having a first input constituting a numerator a second input constituting a denominator and an output constituting a quotient, said product signal being applied to said first input, and said output of said dividing means being applied to said second input thereof;
 means for integrating said output of said dividing means to provide a command signal proportional to the required ignition spark timing angle; and
 means responsive to said command signal for adjusting the ignition spark timing angle.

3. In an internal combustion engine of the spark ignition otto cycle type, means for optimizing the timing angle of the ignition spark in the combustion cycle, comprising, means providing a signal indicative of the manifold absolute pressure of said engine;
 means providing a signal indicative of the speed of said engine;
 means for multiplying said manifold absolute pressure signal by said speed signal to provide a signal indicative of the power output of said engine;
 means providing a signal proportional to the time derivative of said power output signal;
 dividing means having a numerator input, a denominator input and a quotient output;
 means applying said time derivative signal to said divider numerator input;
 means applying said divider quotient output to said divider denominator input;
 means providing a signal proportional to the time integral of said divider quotient output;
 means for generating said ignition spark at an adjustable timing angle in the engine combustion cycle; and
 means responsive to said time integral signal for adjusting the timing angle of said spark generating means in such sense as to reduce the rate of change with respect to timing angle of said power output signal.

4. The combination claimed in claim 3 wherein said spark generating means is of the cam operated breaker type, said cam being driven synchronously with the engine cycle and at an adjustable phase angle with respect to said engine cycle and said last named means includes a position servo for adjusting said phase angle proportionately to said time integral signal.

5. The combination claimed in claim 3 wherein said engine includes an electronic fuel injection system for controlling at a substantially constant value the air/fuel ratio of the engine combustion charge.

6. The combination claimed in claim 5 wherein said electronic fuel injection system includes;
    means for determining the presence or absence of oxygen as a constituent of the exhaust gases of said engine; and
    means responsive to said oxygen determining means for controlling the quantity of fuel injected during each combustion cycle of said engine.

* * * * *